United States Patent [19]

Camboulives et al.

[11] 3,954,225
[45] May 4, 1976

[54] APPARATUS FOR CONTROLLING EXHAUST NOZZLE FLAPS

[75] Inventors: Andre A. M. L. Camboulives, Savigny-sur-Orge; Theophile F. Le Maout, Cesson; Roger A. J. Vandenbroucke, Antony, all of France

[73] Assignee: Societe Nationale d'Etude et de Constructioin de Moteurs d'Aviation, Paris, France

[22] Filed: July 3, 1975

[21] Appl. No.: 593,177

[30] Foreign Application Priority Data
July 4, 1974  France ............................. 74.23233

[52] U.S. Cl. .......................................... 239/265.41
[51] Int. Cl.² ......................................... B64C 15/06
[58] Field of Search ............... 239/265.19, 265.33, 239/265.37, 265.39, 265.41

[56] References Cited
UNITED STATES PATENTS 2,697,907   12/1954   Gaubatz ...................... 239/265.39
2,811,831   11/1957   Geary et al. .................. 239/265.39
3,360,074   12/1967   Rahvier et al. ............... 181/33.221

Primary Examiner—John J. Love
Assistant Examiner—Michael Mar
Attorney, Agent, or Firm—Bacon & Thomas

[57] ABSTRACT

A variable section exhaust nozzle for jet engines which has two sets of flaps at the edge of the nozzle opening, one set spanning the spaces between the flaps of the other set. Both sets of flaps are hinged to the nozzle on tangential axes. Fluid-operated jacks are serially connected to define a polygon around and outwardly of the flaps. Levers connect the jacks to the outer set of flaps so that radial expansion or contraction of the polygon, by actuation of the jacks, causes the outer set of flaps to swing outwardly or inwardly to thereby vary the effective area of the nozzle opening. The flaps of the inner set are held outwardly against the outer flaps by the pressure of gases issuing from the nozzle. In another embodiment two additional sets of flaps are hinged to the free edges of the first set and additional fluid-operated jacks are provided for them to thus increase the range of nozzle opening adjustments.

4 Claims, 6 Drawing Figures

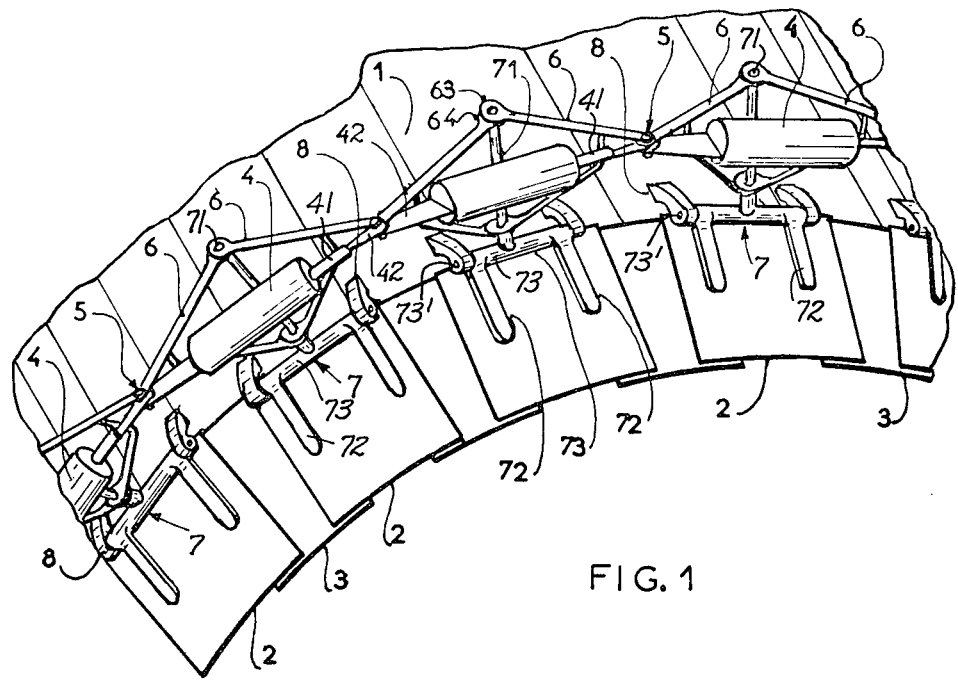
FIG. 1
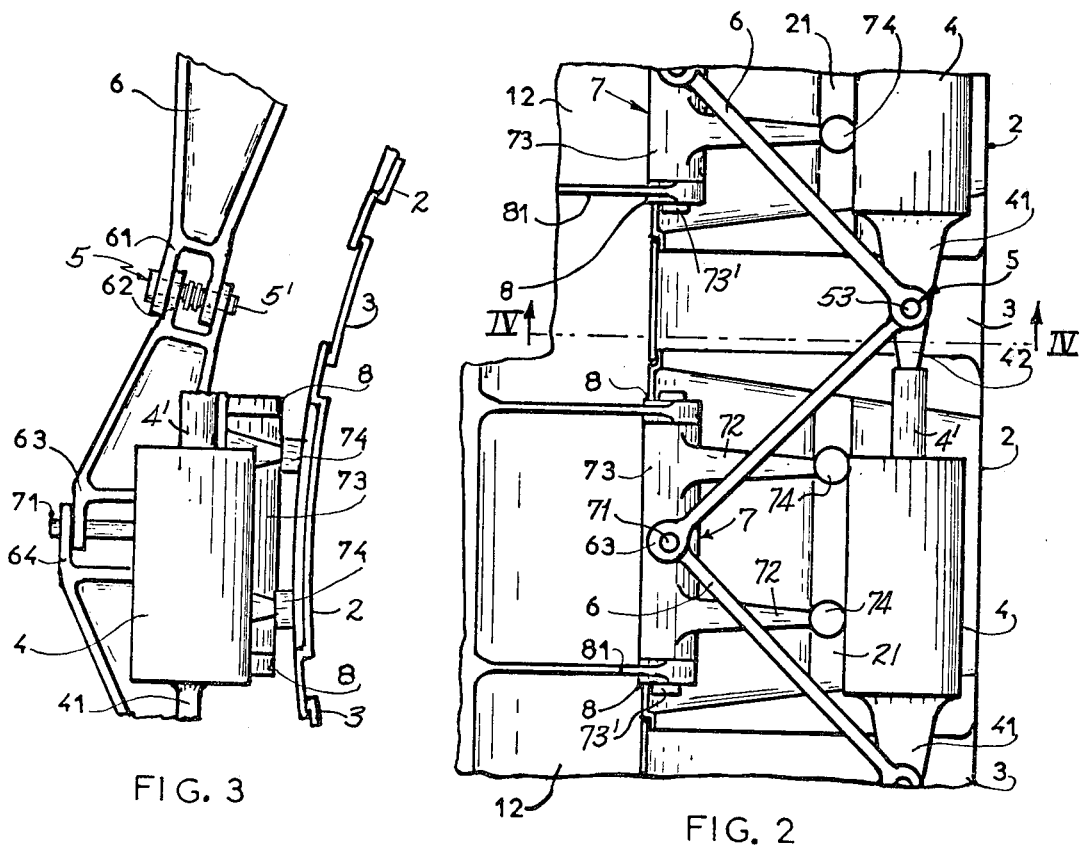
FIG. 3
FIG. 2

APPARATUS FOR CONTROLLING EXHAUST NOZZLE FLAPS

This invention relates to apparatus for the control of movable flaps for varying by constriction the cross-sectional area of exhaust ducts or nozzles in jet engines, and especially in aircraft turbojets. It is particularly related to improvements in apparatus of the type disclosed in French Patent No. 1,478,474, filed Mar. 2, 1966, and issued Mar. 20, 1967.

It will be seen that the latter apparatus was conceived for control of variable cross-section exhaust nozzles comprising two sets of movable flaps, conformed as cylindrical segments and mounted to rotate freely about axes perpendicular to the axis of the exhaust duct, each on an annular shaft mounted downstream of the rearward end of the exhaust nozzle outlet. The flaps of the first set are disposed with spaces therebetween permitting them to assume, without abutting one another, a minimal cross-section in which the passage is essentially frustoconical. These flaps are actuated by jacks and are called the controlled flaps. The flaps of the second set, called the free or follower flaps, are arranged interiorly of the first set, occupying and overlapping the spaces therebetween, and being adapted to engage the controlled flaps under the influence of the exhaust gas pressure. This apparatus is characterized in that the actuating jacks are fluid controlled (liquid or gas), mounted around and spaced from the controlled flaps, and their axes are tangential to a circumference situated in the plane of a diametric median section of the exhaust nozzle. Each actuator, while free to rotate, is connected with those adjacent to it by connecting elements called synchronization elements, which are adjacent the follower flaps, with the latter being rigidly mounted at one end thereof to the synchronization levers. The other end of each synchronization lever is articulated on the annular portion of the nozzle sidewall at either side of the connecting joint of each following flap, and thus can pivot in an axial plane relative to the exhaust nozzle. The jacks and synchronization elements form a polygonal ring, actually almost circular, of which the perimeter and consequently the diameters increase or decrease when the pistons of the jacks are extended or retracted. The levers, connecting rods and interdependent synchronization elements adjacent the edges of the controlled flaps thus constitute nondeformable triangular prisms which pivot around a cooperating edge of the nozzle sidewall under the influence of fluid control, forcing the nozzle outlet into the cylindrical or conical form desired.

This apparatus can also be applied to the controlled flaps of "blow-in-door" vane systems, and also to the control of convergent-divergent nozzles, by using two annular sets of jacks. It is simple, light in weight and relatively inexpensive.

The improved control device of the invention which is the object of the present application offers the same advantages. But it is an even simpler embodiment, comprises fewer elements and connecting joints, and thus fewer points to loosen, occupies less space, and, using the same quantity of material, has greater rigidity.

The apparatus of the present invention for controlling the cross-section of an exhaust nozzle by constriction comprises, as in the aforecited patent, fluid-controlled jacks arranged in succession to form a chain of links of variable length disposed around and spaced from the controlled flaps. It is characterized in that the end of the body or the shaft of each jack is connected to the end of the body or the piston rod of each adjacent jack by a pivot joint, the joint being supported by the ends of two brackets of equal radius, each one belonging to a separate pair of brackets. The two brackets of each pair, respectively supporting the joint at the end of the same jack, pivot around an axle arranged in the axial plane of the nozzle outlet, each axle forming one of the arms of a bellcrank lever, of which the other arm comprises at least one fixed tab portion attached to the controlled flap adjacent the jack. The two arms of each lever are connected by a shaft pivoting about an axis disposed in a diametric plane of the nozzle, the shaft being connected to the rearward end of the exhaust duct. Each pair of suppots which is interdependent with the ends of each jack thus constitutes part of an isoceles triangle which opens or closes under the influence of the jack, and the pivot axis of which is oriented as a function of the extension or contraction of the polygonal contour, determined by the set of jacks controlling the orientation of the controlled flaps.

Other arrangements and their resulting advantages will appear in the following description of exemplary embodiments, which refer to the attached drawings, in which:

FIG. 1 is a partial kinematic view in perspective of the apparatus of the invention applied for the control of the flaps of a convergent nozzle.

FIG. 2 is a partial elevation of an embodiment of the apparatus shown in FIG. 1.

FIG. 3 is a partial end view of the apparatus of FIG. 2.

Figure 4:
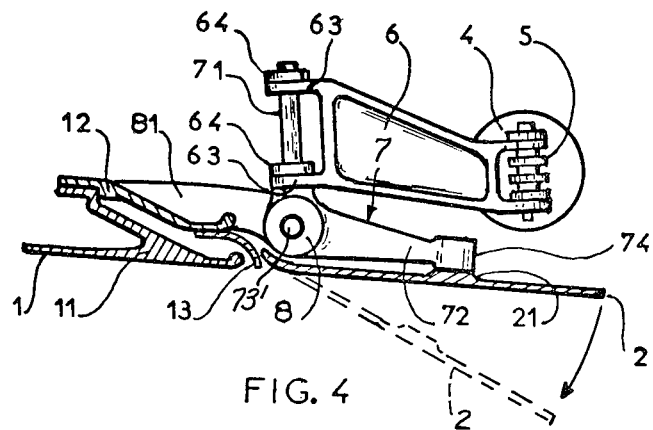
FIG. 4 is a partial cross-sectional view taken along the line IV—IV of FIG. 2.

The purpose of the perspective view of FIG. 1 is to show the function of the kinematic sequence of the apparatus according to the invention. To facilitate reading the drawing, certain of the elements are provided with forms slightly different from those shown in the other figures. But the arrangements of the pivot joints and the movements remain identical. The controlled flaps 2 and the follower flaps 3 are articulated at the downstream or outlet end of the collar 1 which is the annular sidewall of the exhaust nozzle. In order to simplify this figure, the pivotal mountings of the follower flaps 3 and the fluid control feed lines of the jacks 4 are not shown. These are disposed around the controlled flaps 2 in spaced opposing relation, and their axes are tangential with respect to a circumference disposed in a diametric median plane relative to the said flaps. They are shown oriented in the same direction, that is to say in such a way, according to the drawing, that the piston rods 41 of the jacks are extended in the inverse trigonometric directions, each extending in the same direction about the nozzle. They can, however, be advantageously mounted in the reverse manner, i.e., with the ends of the piston rods or bodies facing each other, which would simplify the arrangement of the feed lines.

Figure 5:
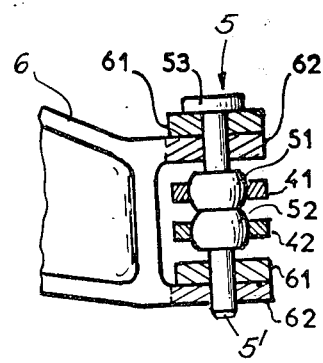
FIG. 5 is a larger-scale detail view of a pivot joint at the end of a bracket between two of the jacks shown in FIG. 2.

The body and the piston rod of each jack 4 are extended respectively by members 41 and 42, connected with similar extension members of the adjacent actuators by a pivot joint 5, to be described hereinafter. The pivot joints 5 are supported by yokes 61 (see FIG. 5) at the ends of brackets 6. The two brackets 6 supporting pivot joints 5 at either side of the same jack pivot about an axle or rod 71 which constitutes one transverse arm of a bellcrank lever 7 of which the other arm comprises two tabs 72 mounted on each controlled flap 2 adjacent its side edge. A shaft 73 forms the connection between the two arms 71 and 72 of each lever 7 and terminates in pivot pins 73' pivoting in bearings 8 mounted at the end of collar 1. The shafts 73 constitute the articulation axles or hinges for flaps 2 and levers 7, there by assuring, by means of the isosceles triangle joint formed by the pairs of brackets 6, the connection of said flaps with the ends of the piston rods 41 and bodies of jacks 4. Whatever the degree of extension of the jacks, they form tetrahedrals together with brackets 6 and axles 71, with their edges remaining symmetrical relative to the axial planes passing through axles 71. Jacks 4 also form the sides of a regular polygon which is concentric with the nozzle. Flaps 2 and 3 are shown in retracted position in FIG. 1. When the piston rods of the jacks 4 are extended by fluid pressure, the perimeter of the polygon is increased and the axles 71 rotate, moving shafts 73, tabs 72 and flaps 2, i.e., the bellcranks 7 pivot about axes extending through pins 73'.

It is to be noted that the variable perimeter polygon of this apparatus includes only one-half of the articulation points of the polygon in the apparatus of the aforecited patent, because the jacks are connected directly together, and not by means of synchronization elements.

FIGS. 2, 3, 4 and 5 relate to an embodiment of the present invention for use in a convergent nozzle. It is shown with the flaps in maximum open position, i.e., in an essentially cylindrical configuration. In FIG. 4, the position of the flaps corresponding to minimum cross-sectional opening is shown in dotted lines. The elements of FIGS. 2 to 5 have the same reference numbers as the elements performing the same function in FIG. 1. Support bearings 8, which mount the shafts 73 of bellcrank levers 7, are carried by bosses 81 welded on an annular member 12 which is mounted by spot welding on a frustoconical shroud which cooperates with the downstream end of the exhaust nozzle collar 1. The bodies of jacks 4 are surrounded by a heat-insulated sheeting, not shown. Each pivot joint 5 comprises an axle 5' with a head 53, and on which are fitted perforated spherical segments 51 and 52. These are inserted in apertures having spherical walls, disposed in extension members 41 and 42 of motors 4 that are connected by pivot joints 5. Each axle pin 5' is inserted in the yokes 61 and 62 at the ends of brackets 6. In FIG. 3, the piston rod of jack 4 is cut, to show the pivot joint 5, segments 51, 52 and actuator extension members 41 and 42 and the relative arrangement of yokes 61 and 62 of supports 6. These also include, towards the nozzle collar side, perforated yokes 63 and 64 slipped onto axles 71 of bellcrank levers 7 and abutting (at the lower sides thereof) boxes on shafts 73.

Tabs 72 of levers 7 are provided with bosses 74 at their ends on which flaps 2 are screw-mounted at the reinforcements 21. Within ring 12 is mounted a flexible annular gasket 13 engaging with the front ends of flaps 2 and 3 to provide a gas seal.

Figure 6:
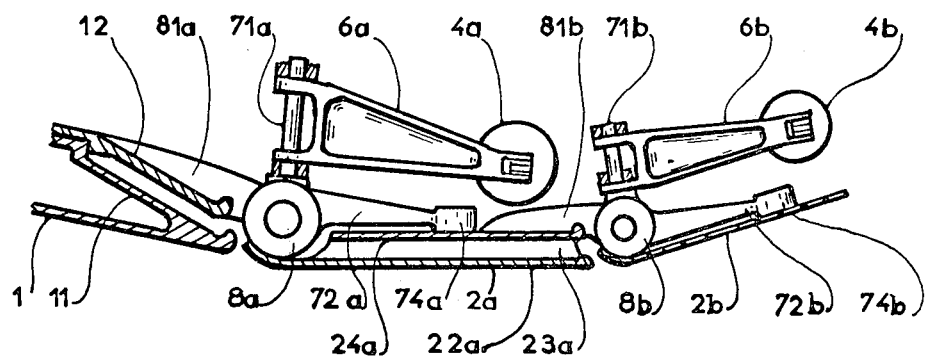
FIG. 6 is a diagrammatic longitudinal view, partly in section, showing an embodiment of the invention as applied for control of the flaps of a convergent-divergent nozzle.

FIG. 6 shows in cross section a tandem arrangement of two assemblies constructed in accordance with the invention for control of flaps of a convergent-divergent exhaust nozzle which can be actuated separately. The elements have the same reference numbers as in the preceding drawings, the only difference being that the elements of the upstream set, articulated on ring 12, are indicated by the same number followed by the letter $a$, and those of the downstream set are indicated by the same number followed by the letter $b$. The downstream set is carried by flaps $2a$ of the upstream set, which are consequently reinforced. The reinforcement can, for example, be of sheet metal pieces $22a$ and $24a$, reinforced by ribs or honeycombs $23a$.

In addition to the disclosed advantages, the apparatus described herein also provides the following advantages: (a) the forces exerted on the controlled flaps are symmetrical and do not cause any parasitic moment; (b) the controlled vanes need not transmit any force to the adjacent controlled flaps; and (c) in case of interruption of supply to a jack, its movement is assured by the supports and pivot joints powered by the adjacent jacks.

We claim:

1. Apparatus for the control of movable flaps in a variable section exhaust nozzle by constriction of the flaps, for use in jet engines and particularly in aircraft turbojets, wherein the exhaust nozzle comprises two annular sets of movable flaps alternately arranged in cylindrical segments, each flap being articulated about an axle perpendicular to the axis of the nozzle, the set of flap axles being generally disposed on a circumference centered about the axis of the nozzle; the first set of flaps being controlled flaps and being actuated by fluid jacks, said controlled flaps having spaces therebetween so that they can assume a position of minimum cross-section forming an essentially conical nozzle without abutting against each other; the flaps of the second set being follower flaps and being mounted to span the spaces between said controlled flaps, and overlapping and engaging said controlled flaps when influenced by combustion gas pressure, the jacks being disposed around and spaced from the controlled flap on axes tangent to a circumference situated in the plane of a diametric median cross-section of said nozzle, said jacks thus forming the sides of a polygon whose perimeter varies as a direct result of the extension of the piston rods of the jacks, characterized in that the end of the body and the end of the piston rod of each jack are connected, respectively, to the end of the body or piston rod of each adjacent jack by pivot joints, each supported by the ends of two equal radial supports, each support belonging to a separate pair of supports, the two supports of each pair respectively supporting the pivot joints which are located on either side of each jack and pivoting about a common axle oriented in an axial plane of the nozzle and forming one of the arms of a bellcrank lever, the other arm of each bellcrank lever comprising at least one tab attached to the controlled flap which is facing the said jack; the two arms of each lever being connected by a shaft pivoting about an axis in the diametrical plane of the exhaust nozzle, each pair of supports thus disposed in an isosceles triangle which opens or closes under the effect of the corresponding jack, the axle of the triangle being oriented as a function of the degree of extension or contraction of the polygonal contour constituted of the set of jacks and controlling the orientation of the controlled flap to the bellcrank lever to which said axle belongs.

2. Control apparatus as defined in claim 1, wherein the piston rods of alternate jacks are disposed in adjacent positions.

3. The apparatus as defined in claim 1 wherein said nozzle is of the convergent-variable.

4. A convergent-divergent, variable-area exhaust nozzle varied by changing the orientation of movable flaps, wherein said nozzle includes a first nozzle section having movable flaps and a second nozzle section also having movable flaps situated to the downstream from said first section, each nozzle section being provided with control apparatus as defined in claim 1, the rotation axles of the control jacks of said second section being interdependent with the controlled flaps of said first section.

* * * * *